Aug. 19, 1958 R. D. TOLLEFSON 2,848,616

STEPPED FREQUENCY GENERATING MEANS

Filed July 16, 1956 4 Sheets-Sheet 1

INVENTOR.
ROBERT D. TOLLEFSON
BY Moody and Goldman
ATTORNEYS

Aug. 19, 1958 R. D. TOLLEFSON 2,848,616

STEPPED FREQUENCY GENERATING MEANS

Filed July 16, 1956 4 Sheets-Sheet 2

INVENTOR.
ROBERT D. TOLLEFSON
BY Moody and Goldman
ATTORNEYS

INVENTOR.
ROBERT D. TOLLEFSON
BY
Moody and Goldman
ATTORNEYS

INVENTOR.
ROBERT D. TOLLEFSON
BY Moody and Goldman
ATTORNEYS

United States Patent Office 2,848,616
Patented Aug. 19, 1958

2,848,616

STEPPED FREQUENCY GENERATING MEANS

Robert D. Tollefson, Cedar Rapids, Iowa, assignor to Collins Radio Company, Cedar Rapids, Iowa, a corporation of Iowa Application July 16, 1956, Serial No. 598,055

4 Claims. (Cl. 250—36)

This invention relates generally to oscillator systems that are capable of providing a very large number of discrete frequencies in a given-repetitious sequence, with a very-fast rate of operation.

The invention provides a large number of discrete frequencies that are spaced by a given frequency increment. The discrete frequencies occur in a given predetermined sequence, which can have any predetermined order of increasing and/or decreasing frequency magnitudes.

The invention may be utilized as the oscillator of a scanning receiver, wherein the receiver searches across a given frequency band, which may be very wide. Furthermore, the invention is capable of being stopped to dwell at any frequency during its stepped variation, regardless of the fast rate at which the steps occur.

Accordingly, the invention can be utilized in a receiver that sweeps across a large-frequency range and stops at a channel which is being utilized to receive or transmit on that channel.

The invention uses a pulse generator to determine its rate of operation. The repetition rate provided by the pulse generator will be the stepping rate of the discrete frequencies at the output of the invention.

The invention includes a series of sections with each section having a bistable circuit. The sections have their bistable circuits connected in tandem, with the input to the bistable circuit of the first section being provided by the output of the pulse generator.

Each section also includes a frequency-generating means capable of sequentially generating two different discrete frequencies. Thus, the frequency-generating means may be two separate oscillators, or it may be a single oscillator with two frequency-controlling elements, such as two crystals, or with a tank circuit tunable to two different frequencies.

Furthermore, each section includes a pair of gate circuits, wherein the gate circuits are alternatively operated by the opposite states of the bistable circuit outputs in the section. That is, one gate is closed while the other is open at any particular instant. The opening of one gate passes one of the discrete frequencies of the associated frequency-generating means, and the opening of the other gate of the pair passes the other discrete frequency of the frequency-generating means.

The invention further utilizes a plurality of frequency mixers with a separate band-pass filter following each mixer. The inputs to the first mixer are provided by the outputs of the first two sections. The band pass filter associated with the first mixer may select either the first-order sum or difference frequency component of the mixer.

Each of the following mixers has one input connected to the output of a different section and has its other input connected to the filtered output of the adjacent-prior mixer.

The invention may use any number of sections; and any filter may select either the sum or difference mixer product. Of course, the mixer frequency inputs should be chosen to minimize undesired spurious components that may pass through the filters with insufficient attenuation.

Further objects, features and advantages of this invention will be apparent to a person skilled in the art upon further study of the specification and the drawings in which, Figure 1 illustrates a general form of the invention;

Figure 1:
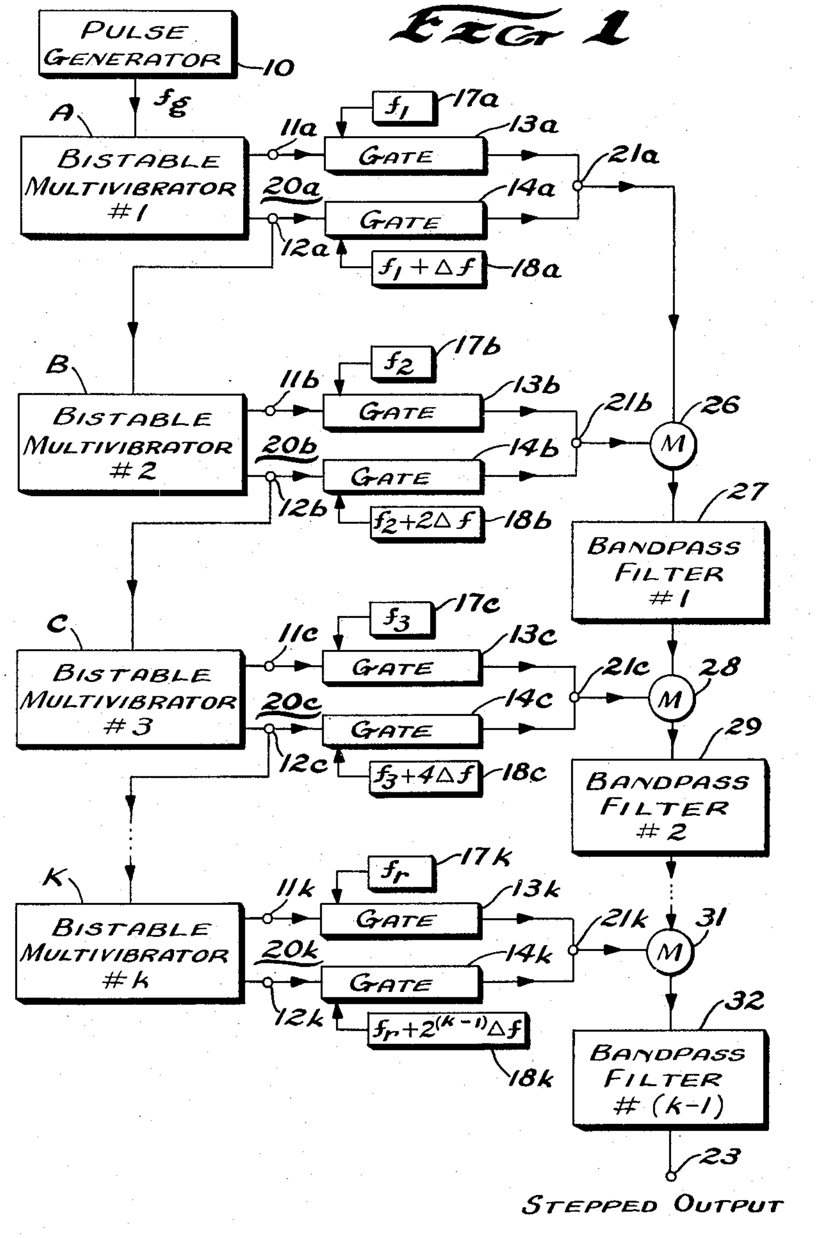

Now referring to the invention in more detail, Figure 1 illustrates a general form of the invention, which includes a pulse generator 10 and a plurality of sections 20, with each section including a bistable circuit, an associated gate means, and a frequency-generating means. Each section 20 provides a frequency output at a point 21, and its output will be one of the two discrete frequencies provided by the switching of its frequency-generating means by means of its bistable circuit.

Accordingly, the gate circuit means controls the respective discrete frequencies of the frequency-generating means in its section and governs which of its two frequencies reaches output point 21.

The bistable circuits in Figure 1 are a plurality of bistable multivibrators A, B, C through K. There may be any number of bistable circuits greater than two, and the number is limited only by design considerations. The multivibrators are connected in tandem, with each, except the last, having one output connected to the input of the following multivibrator. The input to first multivibrator A is connected to the output of pulse generator 10.

Each bistable multivibrator provides two outputs, 11 and 12, which are always at opposite-voltage states. Thus, if initially output 11 is at a high-voltage state, and second output 12 is at a low-voltage state, the next input pulse received by the multivibrator will reverse the states of its outputs. As a result, either output of a multivibrator generates a series of pulses that have one-half the repetition rate of its input pulses to, in effect, provide a pulse-rate division of two. This type of multivibrator operation is well known to provide binary division. Accordingly, the output-repetition rate of any multivibrator may be defined as $f_g/2^n$, where $f_g$ is the repetition rate of pulse generator 10, and $n$ is the number of the multivibrator as it is consecutively numbered from pulse generator 10.

Each bistable multivibrator has associated with it a pair of gate circuits 13 and 14. One gate circuit 13 is operated by one of the multivibrator outputs, and the other gate circuit 14 is operated by the other multivibrator output. Thus, the gate circuits are oppositely actuated, wherein one will be closed while the other is opened and vice versa, with a teeter-totter sequence as the multivibrator receives a sequence of input pulses.

Also, each multivibrator has associated with it a frequency-generator means providing two discrete frequencies. For maximum clarity of explanation, each frequency-generator means in Figure 1 is illustrated by two oscillators, 17 and 18, with each providing a different-fixed frequency. It is to be realized, however, that a single oscillator with two discrete tuning elements, such as crystals, could provide the same function with fewer number of components, since its two frequencies would be sequentially used. Consequently, reference to oscillators 17 and 18 can, as well, be considered a reference to two frequency states for a single oscillator.

The respective frequencies at the output of any frequency generator means are chosen by the respective output states of the associated multivibrator. Consequently, gate circuit 13 is controlled by output 11 of any one of the multivibrators to block or pass the output of oscillator 17 to output point 21.

On the other hand, the other gate circuit 14 is controlled by the opposite output 12 of the multivibrator to block or pass the output of oscillator 18 to output point 21. Due to the teeter-totter actuation of the multivibrator outputs, only one of the discrete frequencies provided by a given set of oscillators 17 and 18 will be received at one time at point 21, which will see a switching between the two discrete frequencies at the output-repetition rate of the controlling multivibrator.

The invention provides the two discrete frequencies of each section with a predetermined frequency difference. It is this frequency difference that is primarily important for the frequency-generating means of any section and not the absolute values of its frequencies. Thus, in regard to the first frequency-generating means, comprised of oscillators 17 and 18, there is a frequency difference of $\Delta f$. Hence, oscillator 17 has a frequency $f_1$, and oscillator 18 has a frequency $f_1+\Delta f$.

The frequency difference $\Delta f$ in the first section determines the frequency increment between adjacent-discrete frequencies in the output of the invention, provided at terminal 23.

The difference between the two discrete frequencies of the frequency-generating means in any section is $2^{(n-1)}\Delta f$, where $n$ is the consecutive number of the section.

Therefore, oscillator **17*b* in the second section has a frequency $f_2$, and oscillator 18*b*** has a frequency $f_2+2\Delta f$.

Accordingly, in the third section, oscillator **17*c* has a frequency $f_3$ and oscillator 18*c*** has a frequency $f_3+4\Delta f$, and so forth to the $k$th section which will have one oscillator 17*k* with a somewhat arbitrary frequency $$f_r+2^{(k-1)}\Delta f$$

A first mixer 26 is provided, which has one input connected to output point **21*a* of first section 20*a* and has a second input connected to output point 21*b* of second section 20*b***.

A first bandpass filter 27 is connected to the output of first mixer 26 to filter either a sum or difference output component of mixer 26. Thus, four discrete output frequencies are provided from filter 27. The bandpass of first filter 27 will be determined by the maximum-frequency spread of its four selected frequencies.

A second mixer 28 is provided with one input connected to the output of first filter 27. The other input of second mixer 28 is connected to frequency-output point **21*c* of third section 20*c***.

A second bandpass filter 29 is connected to the output of second mixer 28 to select either a sum or difference first-order output component.

There will be $(k-1)$ number of mixers, where $k$ is the total number of sections, with each mixer being followed by a filter to select either the sum or difference first-order output component from its mixer. The last mixer 31 provided in the system has one input connected to the output of the second-last bandpass filter and has its second input connected to output point **21*k* of the last section 20*k***.

The bandpass of any filter is preferably about $(2^m-1)\Delta f$, where $m$ is the number of sections preceding the given filter.

It is generally preferable (although not essential to the operation of the invention) for frequencies $f_1, f_2, f_3 \dots f_r$ to have an increasing order. Also, if each of the bandpass filters select the first-order difference frequency provided by its mixer, the frequency extremes of the stepped-frequency output of the invention may be defined as follows: in which the highest output frequency $f_{Hi}$ is:

$$f_{Hi}=f_k+(-1)^1f_{k-1}+(-1)^2f_{k-2}+\dots(-1)^{k-2}f_2+(-1)^{k-1}f_1+\left(2^{k-1}+2^{k-3}+\dots+\frac{1-(-1)^k}{2}\right)\Delta f \quad (1)$$

On the other hand, the lowest output frequency $f_{LO}$ is defined as:

$$f_{LO}=f_k+(-1)^1f_{k-1}+(-1)^2f_{k-2}+\dots(-1)^{k-2}f_2+(-1)^{k-1}f_1+\left(2^{k-3}+2^{k-5}+\dots+\frac{1+(-1)^k}{2}\right)\Delta f \quad (2)$$

The frequency-range extremes defined by Expressions 1 and 2 also specify the bandpass requirements for last filter 32.

Furthermore, Expressions 1 and 2 can also be utilized to determine the bandpass-filter range for any of the prior filters by substituting for $k$ the number $m$ of sections prior to the given filter.

The invention is not restricted to the situation given above where all of the filters select a difference mixer output component and where the frequencies $f_1 \dots f_r$ increase in consecutive order. For example, the situation may be provided where the bandpass filters are all summing filters. In this case, the output frequency range may be defined as follows where the highest frequency $f_{Hi}$ is as follows:

$$f_{Hi}=f_k+(-1)^1f_{k-1}+(-1)^2f_{k-2}+\dots+(-1)^{k-2}f_2+(-1)^{k-1}f_1+(2^k-1)\Delta f \quad (3)$$

And then the lowest output frequency $f_{LO}$ is:

$$f_{LO}=f_k+(-1)^1f_{k-1}+(-1)^2f_{k-2}+\dots+(-1)^{k-2}f_2+(-1)^{k-1}f_1 \quad (4)$$

It is therefore apparent that the same set of sections will provide different output frequency ranges, when all of the filters select mixer sum components rather than mixer difference components. Furthermore, in one case, the stepped-frequency output will have an increasing sequence; and in the other case, it will have a decreasing sequence.

However, as stated above, the invention may provide a combination of both sum and difference filters in a particular embodiment to alter the sequence of steps or to provide flexibility in the order of the predetermined sequence.

Figure 2:
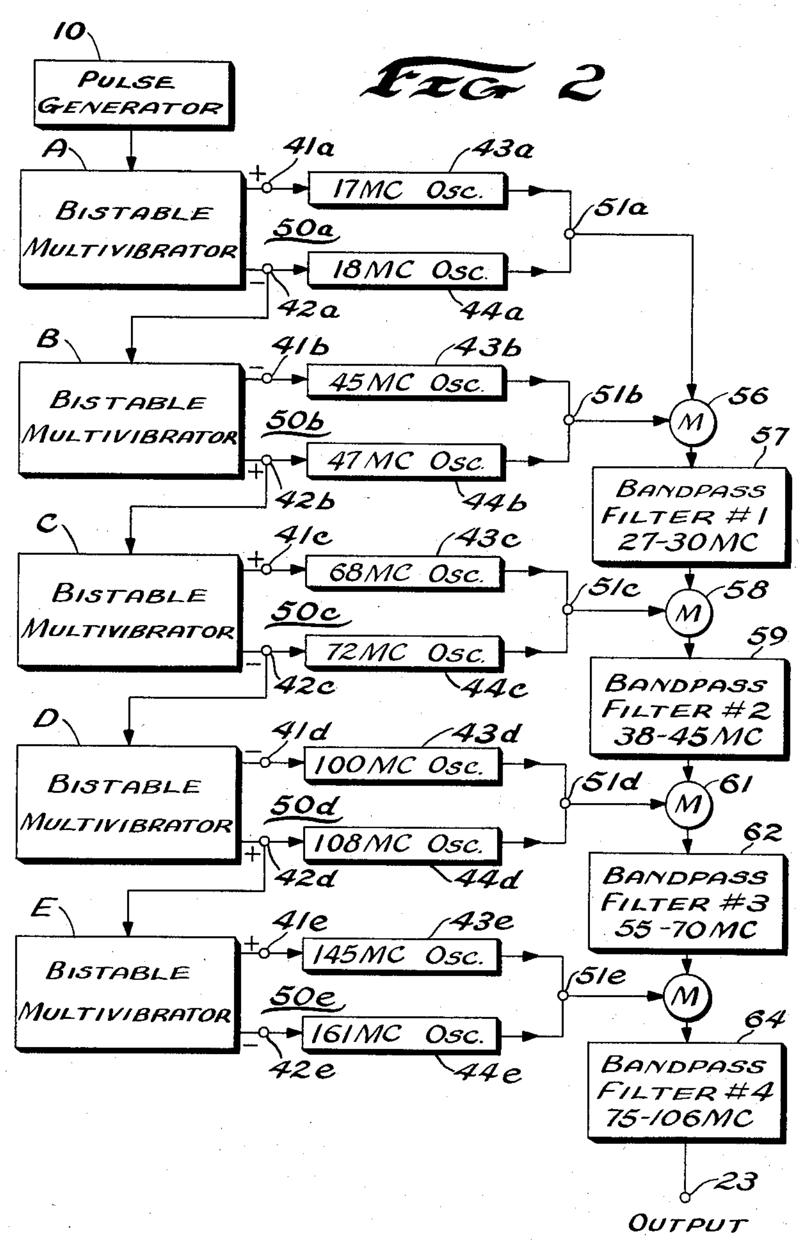
Figure 2 illustrates a specific form of the invention.
Figure 3:
Figures 3 through 12 illustrate waveforms that are functions of time and which are generated in the specific example of Figure 2.

Figure 2 shows a particular numerical arrangement for the invention. It includes a pulse generator 10, which provides a sequence of pulses, as for example, the type illustrated in Figure 3 as negative pulses 40.

A series of multivibrators A, B, C, D, and E are connected in tandem with the input to first multivibrator A being connected to the output of pulse generator 10. The polarities of the multivibrator outputs are indicated in Figure 2 at the initiation of a stepped-frequency output sequence.

The incremental frequency $\Delta f$ of the system in Figure 2 is chosen to be one megacycle-per-second; and the stepped-frequency output of the system varies in increasing order in one-megacycle steps, from 75 megacycles to 106 megacycles.

During the stepped variation of the output of the invention, it remains at one frequency only for the period of one pulse cycle provided by pulse generator 10. After the output frequency has reached its maximum step of 106 megacycles, it drops to its lowest step of 75 megacycles and begins another staircase climb in a repetitious manner. Thus, the frequency output passes through a complete cycle $f_g/2^k$ times-per-second, where $f_g$ is the repetition rate of pulse generator 10, and k is five in Figure 2. Thus, if generator 10 has a repetition rate of 250,000 pulses-per-second, the output at terminal 23 in Figure 2 will pass through its frequency gamut approximately 8,000 times-per-second.

A pair of oscillators **43*a* and 44*a* are associated with first bistable multivibrator A, and their frequencies are separated by the basic incremental frequency, $\Delta f$, which here is one megacycle. Frequencies of 17 megacycles and 18 megacycles are arbitrarily chosen for oscillators 43*a* and 44*a***, respectively.

It is emphasized here that it is the frequency difference of one megacycle between oscillators 43a and 44a that is primarily important to the theoretical operation of the invention. The absolute frequencies of the respective oscillators are arbitrary, except for practical considerations such as frequency mixing and filtering, in order to minimize spurious response from the filtered outputs.

Figure 4:
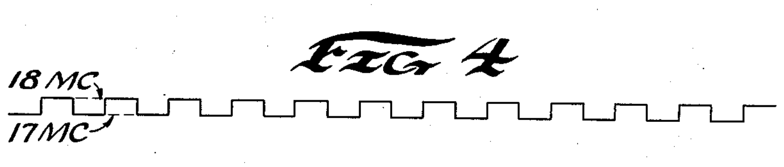

Separate gate circuits are not shown in Figure 2, but they are included within the respective oscillators 43 and 44 to shut them off and turn them on in response to the state of their respective multivibrator outputs. Hence, the 17-megacycle oscillator 43a is gated by multivibrator output 41a; and the 18-megacycle oscillator 44a is gated by the other multivibrator output 42a. Accordingly, the frequency at an output point 51a of first section 50a teeter-totters between the discrete 17 and 18 megacycle frequencies at one-half the repetition rate of pulse generator 10. Figure 4 illustrates the teeter-totter frequency output at point 51a as a function of time.

Second section 50b has a 45-megacycle oscillator 43b and a 47-megacycle oscillator 44b; and they are connected respectively to outputs 41b and 42b of bistable multivibrator B. Thus, oscillators 41b and 42b are sequentially actuated by multivibrator B to provide frequency alternation at their output point 51b, which is illustrated by Figure 5.

Second multivibrator B will oscillate at one-half the rate of first multivibrator A to therefore oscillate at one-fourth the repetition rate of generator 10. This division in repetition rate is apparent by comparison of Figures 3, 4 and 5.

Figure 5:
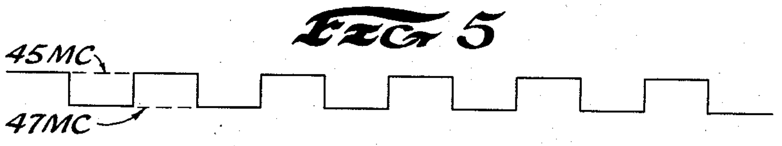

A first mixer 56 has one input connected to point 51a to receive the frequency alternation illustrated in Figure 4; while the other input to mixer 56 is connected to the other point 51b to receive the lower-rate frequency alternation illustrated by Figure 5.

Figure 6:
Figure 7:
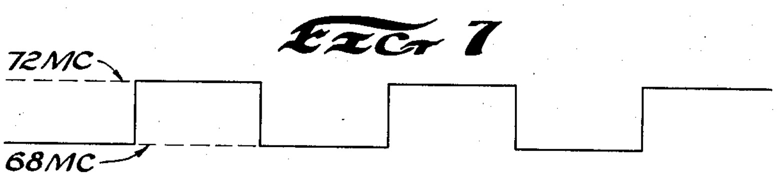

A first filter 57 is connected to the output of mixer 56 to select the first-order difference output components from mixer 56. There will be four difference-frequency outputs from filter 56 due to half-rate timing of the mixer inputs to provide sequentially four frequencies in one megacycle steps at the filter output. A stepped-frequency action will result and is illustrated in Figure 6. Thus, four stepped frequencies are provided at the output of bandpass filter 57 is decreasing order, with an increment of one megacycle between adjacent frequency steps.

The steps will repeat with the continuous waveform of Figure 6 as long as pulse generator 10 provides pulses at a constant-repetition rate.

A third section 50c includes a 68-megacycle oscillator 43c and a 72-megacycle oscillator 44c that are separated by a difference frequency of four megacycles-per-second, which corresponds to $4\Delta f$ illustrated with oscillator means 18c in Figure 1. This is also the range of the output frequency steps from first filter 57.

Oscillators 43c and 44c are respectively gated in a teeter-totter fashion by multivibrator C, as was done in the previous sections. However, the repetition rate for each output of third multivibrator C will be only one-eighth of the repetition rate of generator 10.

A second mixer 58 has one input connected to first filter 57 to receive its small staircase-frequency output, and the other mixer input is connected to point 51b to receive the switched output of third section 50c.

Figure 8:
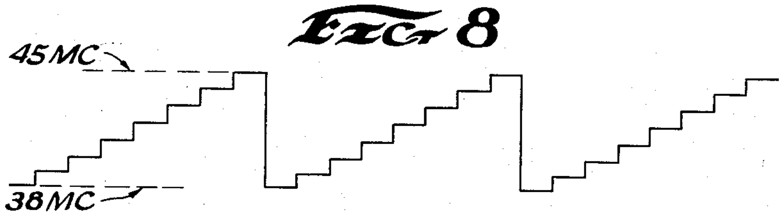

A second bandpass filter 59 is connected to the output of second mixer 58; and it has a bandpass of 38 to 45 megacycles to select the first-order difference frequency component from mixer 58, which is the stepped-frequency variation illustrated by Figure 8. The mixer frequency input from section 50c is timed with respect to the small four stepped frequencies from filter 57 so that after one sequence from filter 57 at the 68-megacycle input frequency, it changes to 72-megacycles; and the heterodyning action in mixer 58 continues the frequency stepping at the output of filter 57 for the next stepping sequence from first filter 57. Thus, the effect of the operation of third section 50c is to double the number of steps in the frequency staircase that is provided by first filter 57 and to nearly double the stepping-frequency range.

Figure 9:
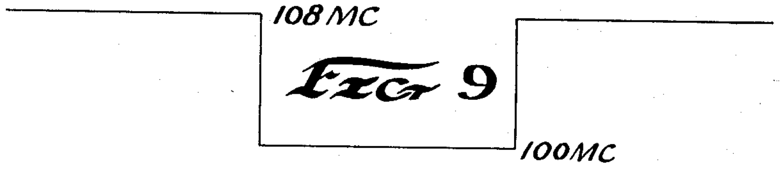

A fourth section 50d includes another pair of oscillators 43d and 44d. Oscillator 43d provides a 100-megacycle output, and oscillator 44d provides a 108-megacycle output. Thus, these oscillators have an 8 megacycle difference, which is $8\Delta f$, and is equal to the output range from filter 59. The outputs from oscillators 43d and 44d are provided at point 51d by the switching of multivibrator D, as illustrated by Figure 9, at one-half the repetition rate of third multivibrator C.

A third mixer 61 has one input connected to point 51d and its other input connected to the output of second bandpass filter 59 to receive its stepped output.

A third bandpass filter 62 is connected to the output of third mixer 61, and it has a bandpass of 55 to 70 megacycles to select the first-order difference output frequencies from mixer 61.

The staircase stepped-frequency output from third filter 62 is double the number of steps and nearly double the frequency range obtained from second filter 59, in the same manner as a doubling of steps occurred by the action of second mixer 58 and its filter 59.

Figure 11:
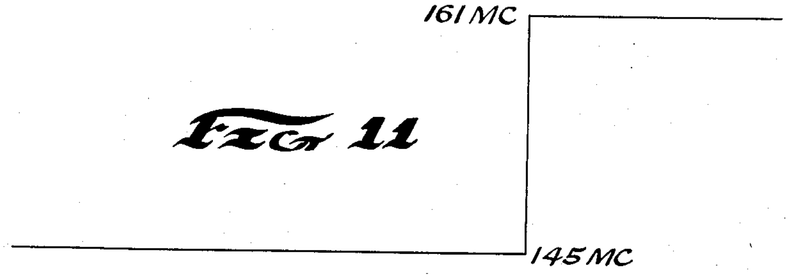

Last section 50e in Figure 2 has a 145-megacycle oscillator 43e and a 161-megacycle oscillator 44e. Multivibrator E switches oscillators 43e and 44e to sequentially provide their outputs at point 51e as illustrated by Figure 11 at the repetition rate of multivibrator E. The frequency difference between oscillators 43e and 44e is 16-megacycles, which corresponds to the formula $2^n\Delta f$ given above.

Figure 10:
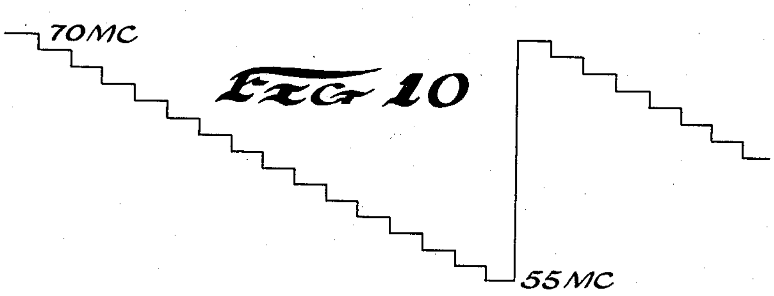

Last mixer 63 has one input connected to point 51e to receive the frequency output illustrated in Figure 11, and has a second input connected to the output of third bandpass filter 62 to receive the stepped frequencies illustrated in Figure 10.

Figure 12:
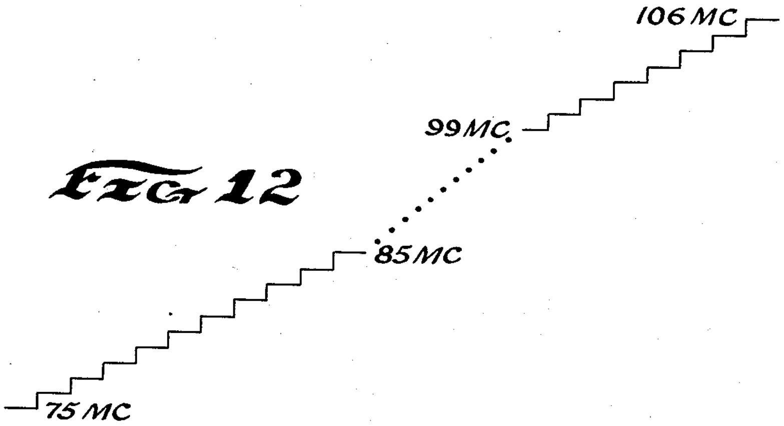

A fourth-bandpass filter 64 is connected to the output of fourth mixer 63 and has a bandpass of 75 to 106 megacycles-per-second to select the first-order difference output frequency from mixer 63. Thus, the resulting frequency staircase provided at the output of filter 64 at point 23 is illustrated in Figure 12. Figure 12 is broken because of lack of drawing space, but it is to be realized that the frequency steps are continuous and have twice the number that are obtained from the output of third filter 62. The doubling operation by mixer 63 and filter 64 is similar to the operation of second mixer 61 and its filter 62.

The absolute frequency of the output may be controlled by the choice of the absolute frequencies of the last oscillators 43e and 44e. In the particular example of Figure 2, these frequencies beat the output frequency down to the range of 75 to 106 megacycles.

Any number of additional sections may be added with a corresponding mixer and filter, wherein each added section doubles the previous number of frequency steps.

In the case where a sum bandpass filter is used, instead of difference filter 64, to select the first-order summed frequency component from last mixer 63, different absolute output frequencies are obtained, although the number of output-frequency steps and their spacing is the same. In such case, the frequency output which would vary from 231 megacycles downwardly to 210 megacycles in one-megacycle steps and repeat repetitiously. The use of a sum filter, rather than a difference filter, reverses the order of the output-frequency steps from a given mixer.

Although this invention has been described with respect to particular embodiments thereof, it is not to be so limited, as changes and modifications may be made therein which are within the full intended scope of the invention as defined by the appended claims.

I claim:

1. A stepped-frequency oscillator comprising a series of bistable circuits connected in tandem, a pulse generator having its output connected to the first of said series of bistable circuits, a different oscillator means associated with each of said bistable circuits, each of said oscillator means having two discrete frequencies having a frequency difference that is $2^{(n-1)}\Delta f$, in which $n$ is the consecutive number beginning with one of said bistable circuits from said pulse generator, and $\Delta f$ is the required spacing between adjacent frequency steps in the output of the system, a plurality of gating means with each connecting a different one of said oscillator means to the output of its respective bistable circuit, a first mixer having its inputs respectively connected to the outputs of said first and second of said oscillator means, a first filter connected to the output of said first mixer to attenuate spurious response, a plurality of additional mixers, and a plurality of additional bandpass filters, with each bandpass filter connected to the output of a respective one of said mixers, one input of each of said additional mixers connected to the output of the immediately preceding bandpass filter, and the other input to each of said additional mixers connected to the output of one of the remaining of said oscillator means, with the last of the bandpass filters providing the output of the system.

2. A stepped oscillator system comprising a plurality of bistable multivibrators connected in tandem, a pulse generator connected to the input of the first of said multivibrators, a different oscillator means associated with a different one of said bistable multivibrators, with each of said oscillator means having two discrete output frequencies, the discrete output frequencies from any of said oscillator means being $2^{(n-1)}\Delta f$, where $\Delta f$ is the frequency spacing between adjacent steps in the output of the oscillator system, and $n$ is the consecutive number beginning with one of the multivibrator, means for sequentially gating the output of said oscillator means in response to the output states of the respective multivibrators, first frequency mixing means connected to the outputs of said first and second oscillator means, a first filter connected to the output of said first mixing means, a plurality of additional frequency mixing means, and a plurality of additional filter means, with each additional filter means connected to the output of one of said additional mixer means, with one input to each additional mixer means connected to the output of the immediately adjacent prior filter means, and the other input to each of said additional filter means being connected to the output of a different one of said oscillator means.

3. A stepped-frequency oscillator system comprising first and second bistable multivibrators with the input to said second multivibrator being connected to one output of said first multivibrator, a pulse generator having its output connected to the input of the first of said multivibrators, a first pair of gating circuits connected respectively to opposite outputs of said first multivibrator, a first oscillator connected to one of said first pair of gate circuits and actuated by one output of said first multivibrator, a frequency mixer having first and second inputs, a second oscillator connected to the other of said first pair of gate circuits and actuated by the other output of said first multivibrator, the outputs of said first and second oscillators connected to one input of said mixer, a second pair of gate circuits respectively connected to the opposite outputs of said second multivibrator, a third oscillator connected to and actuated by one of said second pair of gate circuits, a fourth oscillator connected to and actuated by the other of said second pair of gate circuits, the other input of said mixer connected to the outputs of said third and fourth oscillators, and filtering means connected to the output of said mixer.

4. A stepped-frequency oscillator system as defined in claim 3 including an additional plurality of bistable multivibrators connected in tandem with said second multivibrator, an additional plurality of pairs of gate circuits, with each pair of gate circuits connected respectively to the opposite outputs of a different one of said additional multivibrators, a plurality of additional mixers, a plurality of additional bandpass filters, with one of said additional filters being connected to the output of one of said additional mixers, with one input to each of said additional mixers being connected to the output of the immediately-preceding bandpass filter, an additional plurality of oscillators, with a different one of said oscillators connected to one mixer input by means of one gate circuit of one of said pairs, and another of said oscillators connected to the same mixer input by means of the other gate circuit in said given pair, with the frequency spacing between oscillators associated with each pair of gate circuits being $2^{(n-1)}\Delta f$, where $n$ is the consecutive number beginning with one of the associated multivibrator, and $\Delta f$ is the frequency difference between adjacent output frequency steps from the oscillator system.

References Cited in the file of this patent

UNITED STATES PATENTS

| | | |
|---|---|---|
| 2,369,662 | Deloraine et al. | Feb. 20, 1945 |
| 2,487,857 | Davis | Nov. 15, 1949 |
| 2,594,731 | Connolly | Apr. 29, 1952 |